(12) United States Patent
Kothari et al.

(10) Patent No.: US 7,752,125 B1
(45) Date of Patent: Jul. 6, 2010

(54) AUTOMATED ENTERPRISE RISK ASSESSMENT

(76) Inventors: Pravin Kothari, 6229 Dovetail Ct., San Jose, CA (US) 95135; Yuh-Wen Soung, 12764 Rodoni Ct., Saratoga, CA (US) 95070; Zhangmin Wang, 121 Montelena Ct., Mountain View, CA (US) 94040

( * ) Notice: Subject to any disclaimer, the term of this patent is extended or adjusted under 35 U.S.C. 154(b) by 137 days.

(21) Appl. No.: 11/440,191

(22) Filed: May 24, 2006

(51) Int. Cl.
*G06Q 30/00* (2006.01)
(52) U.S. Cl. .............................. 705/38; 705/39; 705/42; 705/44
(58) Field of Classification Search ............. 705/38–44; 700/90; 713/150–194
See application file for complete search history.

(56) References Cited

U.S. PATENT DOCUMENTS

| | | | |
|---|---|---|---|
| 2002/0147803 A1* | 10/2002 | Dodd et al. | 709/223 |
| 2002/0194119 A1* | 12/2002 | Wright et al. | 705/38 |
| 2003/0153991 A1* | 8/2003 | Visser et al. | 700/79 |
| 2005/0114186 A1* | 5/2005 | Heinrich | 705/7 |
| 2005/0138110 A1* | 6/2005 | Redlich et al. | 709/201 |
| 2005/0228688 A1* | 10/2005 | Visser et al. | 705/1 |

* cited by examiner

*Primary Examiner*—Ella Colbert
*Assistant Examiner*—Hai Tran
(74) *Attorney, Agent, or Firm*—Ash Tankha; IP Legal Services

(57) ABSTRACT

A modern business enterprise will have a large number of heterogeneous assets. The risk associated with a selected asset from the heterogeneous assets can be assessed. In one embodiment, the present invention includes selecting the asset from a plurality of heterogeneous assets for risk analysis, and collecting a plurality of risk factors associated with the selected asset. The risk associated with the asset can be determined by providing the plurality of risk factors to a non-linear statistical data model to derive a risk score associated with the asset.

35 Claims, 6 Drawing Sheets

AUTOMATED ENTERPRISE RISK ASSESSMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention apply to the field of network security and risk assessment, more specifically enterprise risk assessment.

2. Description of the Related Art

Modern business enterprises operate in a complex regulatory environment. Many enterprises must comply with various government regulations both on the federal level and on the state and local levels. For example, most public corporations (at the present time any publicly traded corporation with fifty million or more market capitalization) must comply with the Sarbanes-Oxley Act of 2002. Financial enterprises, heath related enterprises, and other more stringently regulated industries have their own regulatory frameworks.

Furthermore, many business enterprises have internal policies and controls independent of government regulation. These controls and policies may be concerned with security, confidentiality maintenance, trade secret protection, access control, best practices, accounting standards, business process policies, and other such internal rules and controls. The cost of complying with all regulations, rules, policies, and other requirements can be substantial for a large scale business enterprise.

One common problem faced by business enterprises in the control/policy/regulation compliance area is risk assessment. To satisfy either governmental regulations or internal policies, enterprises are often required to assess risk on many levels. Such risk assessment is traditionally done by risk assessment experts who collect evidence from various parts of the enterprise and come up with risks associated with various assets. Often, these experts, or rudimentary automated systems, will use pre-defined formulas to calculate risk. One problem with such calculations is that a formula that works well for one type of asset will generally not work well for other types of assets.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Compliance Management System

Figure 1:
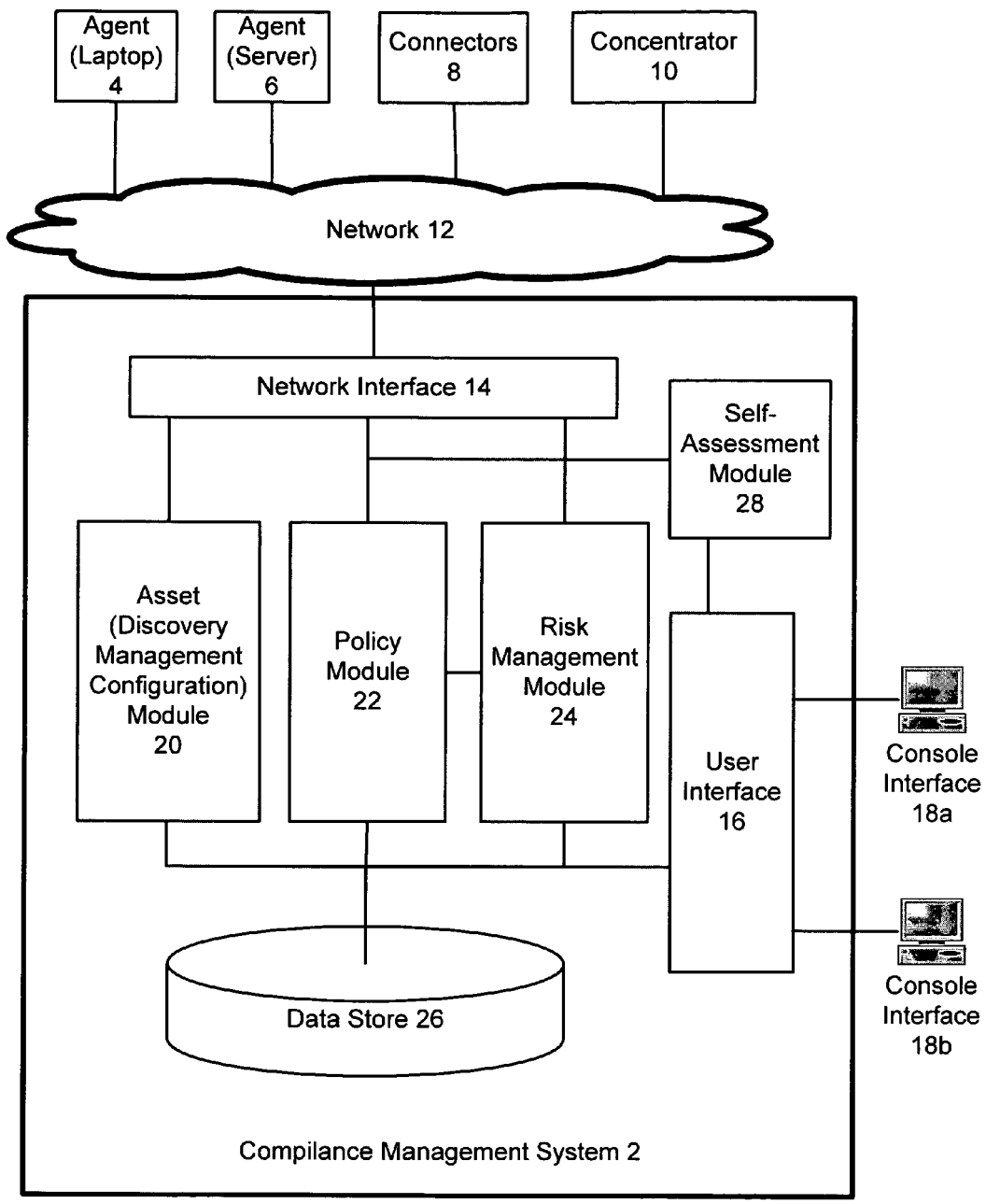
FIG. 1 is a block diagram illustrating a compliance management system according to one embodiment of the present invention.

One embodiment of the invention is now described with reference to FIG. 1. FIG. 1 shows a compliance management system 2. In one embodiment, the compliance management system 2 is provided as a stand-alone appliance that connects to a network, but the compliance management system 2 can be provided in other ways, such as software running on a server, distributed software, or various software and hardware packages operating together.

The compliance management system 2 connects to a network 12—such as a local area network (LAN), Intranet network segment, or the Internet—and can collect data from various sources. For example, the compliance management system 2 can collect data from agents 4 and 6. Agent 4 is an agent associated with and overseeing a laptop (in this example) and agent 6 is associated with a server. In a real-world embodiment, there could be thousands of agents associated with thousands of separate assets.

The compliance management system 2 can also collect information from various collectors 8. Collectors 8 can be custom designed connectors to connect to various network devices and network management and security products already installed by the enterprise. For example, the connectors 8 can enable the compliance management system 2 to connect to, and collect data from, routers, firewalls, directories (such as Microsoft's Active Directory), vulnerability scanners, security information management (SIM) products, enterprise risk management (ERM) products and other such products and applications. Also, some deployments of the compliance management system 2 may not use distributed agents at all, in which case information regarding various assets can be collected via an agent-less concentrator (also referred to sometimes as an aggregator) 10.

In one embodiment, the compliance management system 2 implements asset discovery, configuration, and management functionalities. Such functionality can be provided in the asset module 20 shown in FIG. 1. In one embodiment, the asset module interfaces with the various agents, connectors, and concentrators 2-10 (referred to collectively as "software interfaces" or "distributed software interfaces" for simplicity) via the network interface 14 that connects the compliance management system 2 to the network 12. The asset module 20 performs asset discovery by collecting information about all assets connected to and/or visible to the network 12.

Such assets can include, but are not limited to, laptops, desktops, workstations, operating systems and other applications, servers, users, routers, intrusions detection devices (IDS), firewalls, printers, and storage systems. Assets can be imported from various connected applications, such as vulnerability scanners, directory applications, ERM, SIM, and other security-related products, and so on. Assets can also be non-information technology assets, such as people, users, buildings, and so on. Some assets, such as buildings, departments, and networks include other assets.

In one embodiment, the asset module 20 can also be used to configure asset attributes. This can be done by an operator of the compliance management system 2 via the user interface 16 exposed to the user by consoles 18a and 18b. There may be more or less consoles, which will be collectively referred to as console interface 18.

For example, an agent can report a newly discovered laptop computer. The agent can automatically report back on available attributes, such as central processing unity (CPU) type, the operating system running on the laptop, the types of memory installed, and so on. A user (typically a system administrator) can then add extra attributes to the laptop, such as business owner, business classification, group, and other similar attributes.

The discovered and configured assets can be stored, in one embodiment, in data store 26. Data store 26 can be implemented as a disk, a data server, or some other physical storage means. It can reside inside or outside of the compliance management system 2. The data store 26 can include various databases. One such database can be an asset database, having records corresponding with managed assets. The assets discovered and stored in the asset database can be managed, in one embodiment, from the console interface 18 by editing various attributes of the assets.

In one embodiment, policy compliance functionality is provided by the system 2 by implementing a policy module 22. The policy module 22 can enable a user—via the user interface 16—to author and edit policies and policy templates and apply policies to various assets. The policy module 22 also maintains a policy database in the data store 22. In one embodiment, policies can also be labeled, grouped and organized according to certain predefined roles for personnel. For example, "engineer level 1" can be a role that has a list of specific policies associated with it.

In one embodiment, the compliance management system 2 also provides risk management functionality by implementing a risk management module 24. Such system could be called a compliance/risk management system, or risk management system, but to avoid confusion, the system will be referred to as a compliance management system 2. The risk assessment module 24 analyzes multiple sources of information, including the compliance management system 2, to determine the risk the enterprise is exposed to. In one embodiment, the risk management module collects information—in addition to the compliance management system—from the enterprise's vulnerability assessment systems, SIM systems, asset configurations, and network traffic reports. Other sources of information may be used as well. In one embodiment, the risk management module determines a simple metric to express the enterprise's risk profile using all the collected information.

Figure 2:
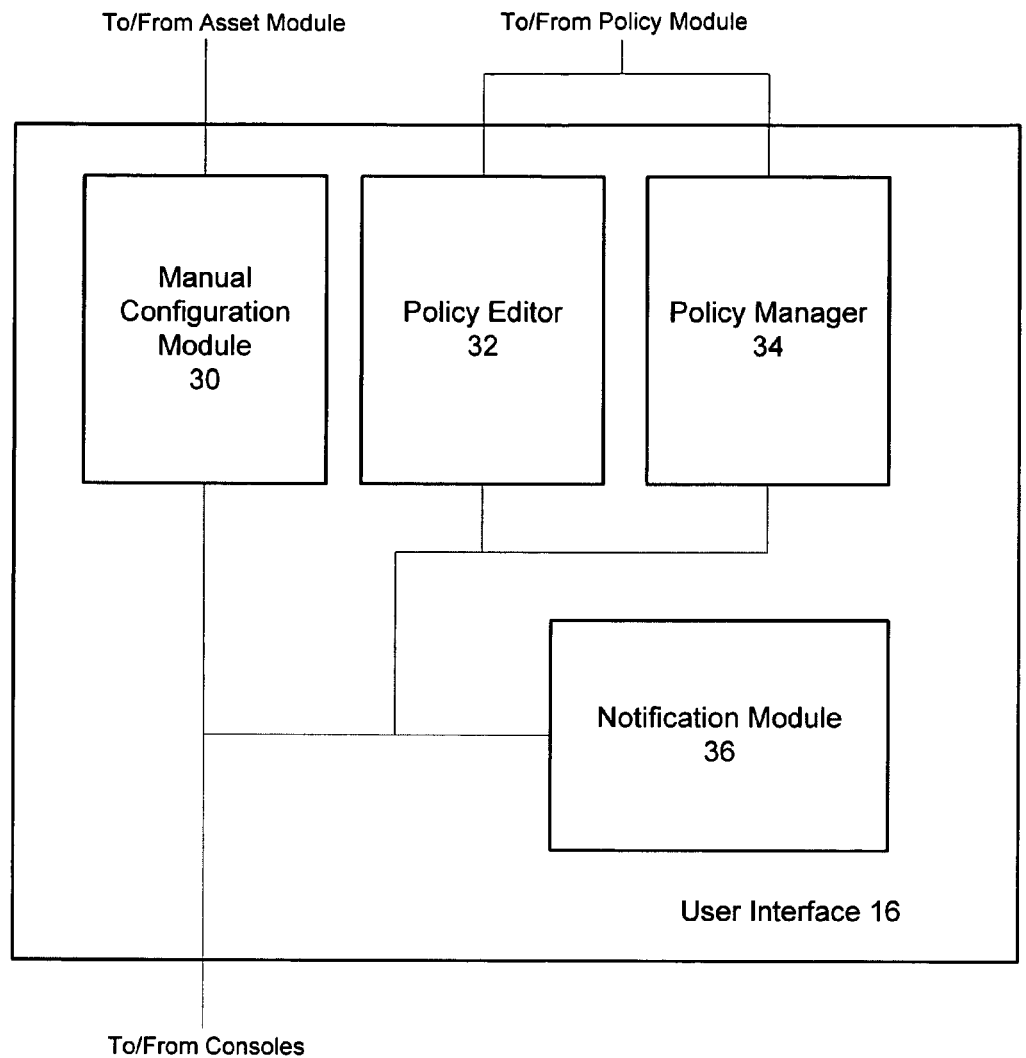
FIG. 2 is a block diagram illustrating a user interface module for a compliance management system according to one embodiment of the present invention.

As mentioned above, the compliance management system 2 also includes a user interface 16 which is exposed to users of the system 2 by consoles 18. In one embodiment the consoles 18 are browser-based, allowing for administration and use of the system 2 from any network-attached work station, or through a remote network connection. In one embodiment, the user interface enables an administrator to select from a list of regulations—such as Sarbanes-Oxley (SOX), Gramm-Leach-Bliley Act (GLBA), Health Insurance Portability and Accountability Act (HIPPA), Card Holder Information Regulation Program (CISP)—and display functionality relevant to the selected regulation. Similarly, the user interface can enable an administrator to select from a list of standard frameworks—such as ISO-17799, Control Objectives for Information and related Technologies (COBIT)—and display functionality relevant to the selected regulation or framework. FIG. 2 provides a more detailed view of the user interface 16 according to one embodiment of the present invention.

The user interface 16 can implement a manual configuration module 30 that allows the user to manually configure asset attributes, as described in the example of the laptop being assigned to a business owner (and other user-defined attributes) above. The user interface can also implement a policy editor 32. The policy editor 32 can assist users in naming and authoring policies.

The policy editor 32 can also provide access to a policy template database stored on the data store 26 having template policies. A user can then create a specific policy instance using a preconfigured template by saving the policy instance as a policy. The policy editor 32, in one embodiment, also includes access to a script-based policy language that allows for highly flexible authoring of almost any type of desired policy. In addition, the policy editor 32 can be used to edit saved policies and policies from various preconfigured policy databases as well as author and edit policy templates.

In one embodiment, the policies that can be authored by the policy editor 32 are highly flexible. Such policies include technology-based policies, such as password length and firewall configurations. Furthermore, some policies can be process related, ensuring that certain process owners take certain actions. Yet other types of polices can include some that cannot be automatically enforced in an information technology sense. For example, risk assessment surveys must be manually filled out by someone responsible for the domain being surveyed, and a policy can include the requiring of such a survey being filled out periodically. Since such policies require at least some human interaction, they are sometimes referred to herein as "manual" policies.

The user interface 16 can also implement a policy manager 34. The policy manager 34 allows the user to organize and apply policies. Policies can be associated with controls that are designed to mitigate against specific threats, as defined in various standards, such as ISO-17799. In one embodiment, the policy manager can be used to identify threats, define (or import) controls, and associate policies to controls to implement the controls. One control may be implemented using several policies, and a policy may be occasionally used in multiple controls. In one embodiment, policies are applied directly to assets or groups of assets. The user interface 16 can also include a notification module 36 to send alerts and reports regarding compliance management and risk analysis.

Returning to referencing FIG. 1, the compliance management system 2 can also include a self-assessment module 28. The self-assessment module 28 maintains and accesses various self-assessment surveys that can be stored in data store 26. The self-assessment module 28 may periodically, or under the direction of the policy module 22 or the user interface 16, send surveys to various individuals for completion. The self-assessment module 28 can analyze the results of such surveys and provide feedback to various other parts of the system 2.

Risk Assessment

Figure 3:
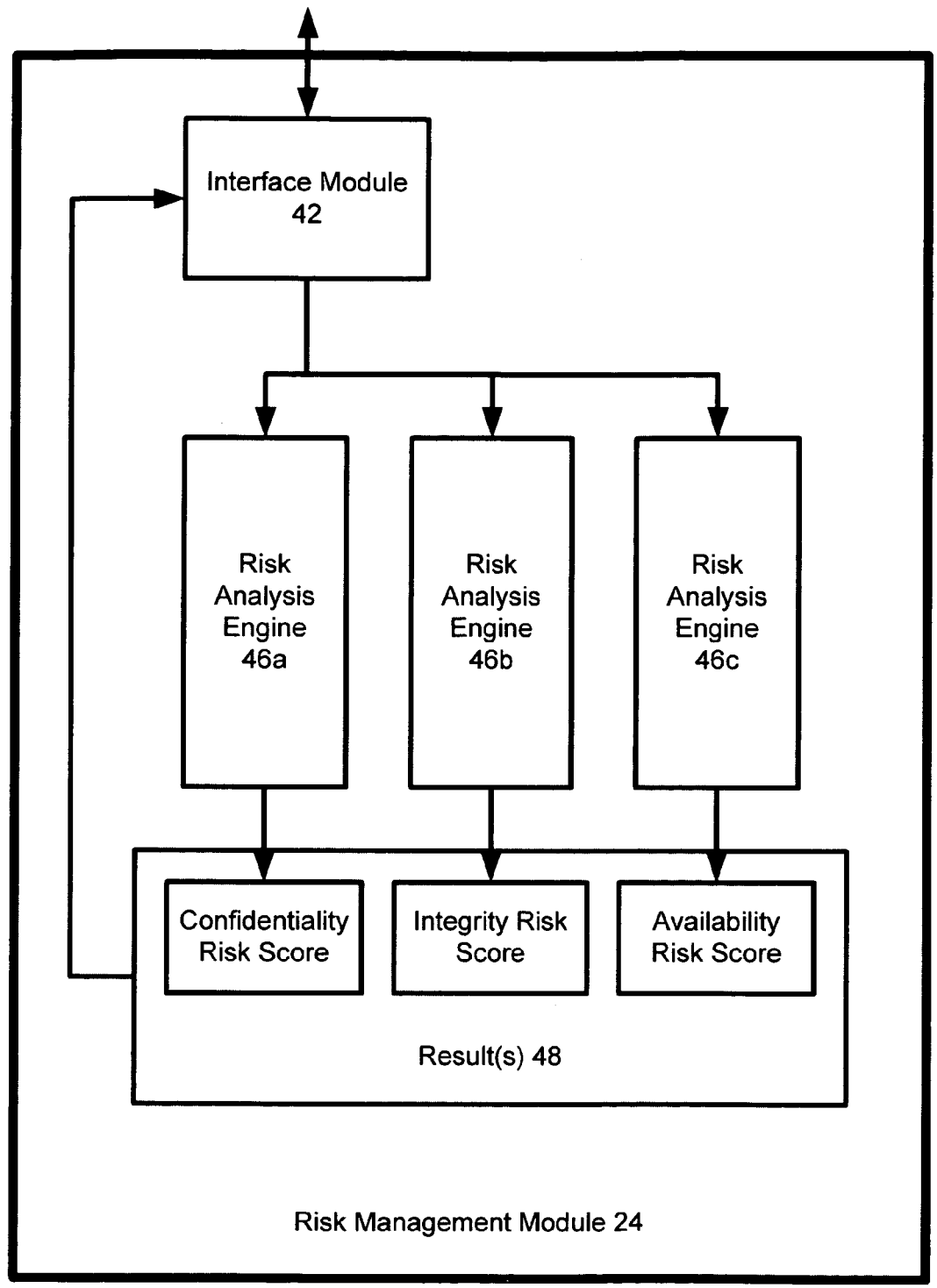
FIG. 3 is a block diagram illustrating a risk management module according to one embodiment of the present invention.

As described above, one embodiment of the present invention includes risk assessment, analysis, reporting, and management functionality provided by the risk management module 24. One embodiment of the risk management module is now described with reference to FIG. 3. Risk management module 24 includes an interface module 42 to allow communications between the risk management module 24 and the various other modules of the compliance management system 2, as will be discussed in more detail below.

In one embodiment, the interface module collects 42 collects data from the asset module 20, the policy module 22, and the self assessment module 28, and is managed and produces results vial the user interface 16. In one embodiment, risk is associated with individual assets, such as machines (laptops, desktops, servers, routers), applications (ESM, SAP), people, and other asset types. Thus, in one embodiment, when the risk of an asset is to be assessed, the interface module collects various risk factors for the asset.

Various embodiments of the present invention can use different risk factors for risk assessment; the invention is not limited to any specific factor or set of factors. In one embodiment, the risk factors collected include the impact of the asset, a measurement of the assets importance to the business. The impact, or business impact, of an asset can be broken down into three categories. One impact category is confidentiality; an asset whose confidentiality is very important would have a higher impact than one that does not contain any secrets. Another impact category is integrity, a measure of the business impact of compromise in the authenticity of information or data related to the asset. Yet another impact category is availability, a measure of the business impact of the asset being "offline," or otherwise unavailable. There could be additional categories, or different impact categorizations used.

Another risk factor can be the vulnerability of the asset. A measure of asset vulnerability can be imported by the compliance management system 2 through one of its software interfaces, and collected by the interface module 42 from the compliance management system 2. For example, a vulnerability score for the asset can be imported from a vulnerability scanner such as Nessus.

Another risk factor can be the number of SIM incidents associated with the asset by some SIM product. This measurement may be of SIM trouble tickets or security event within some time window, or for a real-time risk measurement, this measurement can be the number of open tickets in the SIM product for the asset. Another risk factor can be the compliance score associated with the asset by the policy module 22, which itself in a measure of the compliance of the asset with the policies being enforced by the compliance management system 2. Yet another risk factor can be the result of a risk assessment survey completed by a person about the asset. There can be various other risk factors related to an asset, such as whether the asset is managed by the compliance management system 2 using an agent resident on the asset, whether the asset is internal (behind a firewall and not exposed to the outside) or external, and other such considerations.

In one embodiment, the collected data representing the various risk factors is provided to one or more risk analysis engines 46. In one embodiment—illustrated in FIG. 3—three risk analysis engines 46a-c are used, but the invention is not limited to any specific number of risk analysis engines 46, which could range from 1 to any number, although in a real world system their numbers are likely to be between 1 and 10. The risk analysis engine 46 calculates a risk score of the asset. The risk score can be expressed as a percentage, with higher percentages indicating higher risk.

In one embodiment using three risk analysis engines, each risk analysis engine 46 outputs one of a confidentiality risk score, an integrity risk score, and an availability risk score, representing the risk associated with these asset impacts described above. For example in FIG. 3, risk analysis engine 46a is given the confidentiality impact of the asset as an input and thus outputs the confidentiality risk score of the asset. Similarly, in FIG. 3, risk analysis engine 46b is given the integrity impact of the asset as an input and thus outputs the integrity risk score of the asset, and risk analysis engine 46c is given the availability impact of the asset as an input and thus outputs the availability risk score of the asset.

These determined risk scores are the results 48 of the risk management module. The results can be combined to produce a single result 48 if desired, or all separate results produced can be delivered to the interface module 42 for presentation to an administrator or risk analysis professional via the user interface 16. In another embodiment, all the various categories of impact scores can be provided as input to a singe risk analysis engine 46 to provide a singe risk score for the asset. In yet another embodiment, inputs for the various risk analysis engines 46 may not overlap at all, or only overlap partially.

Risk Factor Mapping and Statistical Modeling

Figure 4:
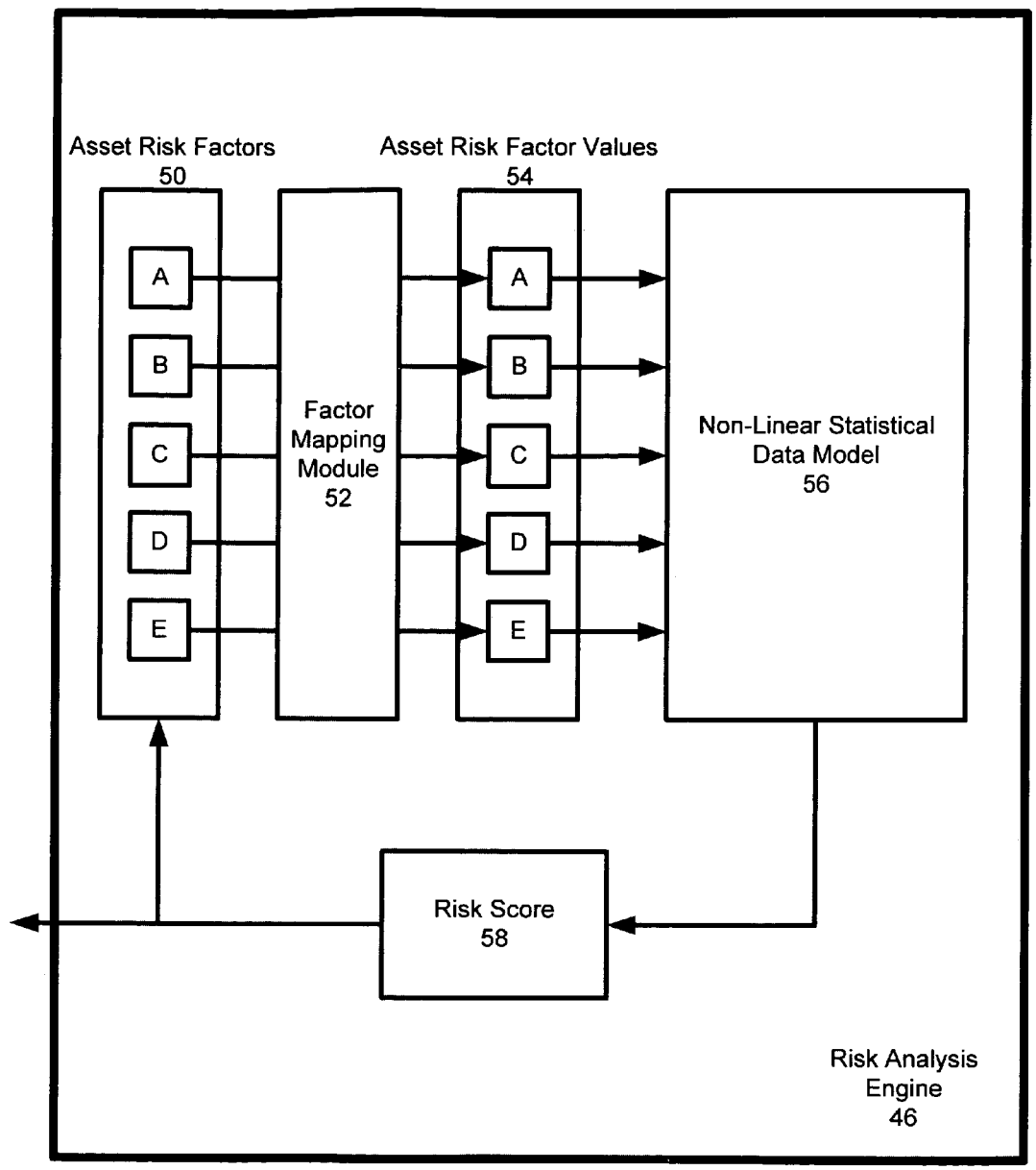
FIG. 4 is a block diagram illustrating a risk analysis engine according to one embodiment of the present invention.

In one embodiment, described with reference to FIG. 4, the present invention uses a non-linear statistical data model to calculate the risk associated with an asset. Such non-linear statistical data models include neural networks, decision trees, Bayesian networks, genetic algorithms, and several other types of non-linear statistical data models. In one embodiment, the non-linear statistical data model 56 used by the risk analysis engine 46 is a neural network (sometimes referred to as a neural net). Neural network have numerous applications, for example, they are used to determine people's credit scores based on information about them such as number of credit cards, late payments, income, and so on. The concept of neural networks and other such statistical data models are well-known and familiar to one skilled in the art.

In one embodiment, the various asset risk factors 50 collected by the interface module 42 are first mapped to asset risk factor value 54 to facilitate their input into the non-linear statistical data model 56. In one embodiment, mapping the asset risk factors 50 to the asset risk factor values is performed by the factor mapping module 52. The map performed by the factor mapping module 52 may be user configurable, and it can be specific to the type of asset.

One function of the factor mapping module 52 is to convert the asset risk factors to a format that is usable by the non-linear statistical data model 56. For example, a vulnerability factor may return a "medium" vulnerability for the asset. However, in one embodiment, the non-linear statistical data model 56 works on numbers. Thus, the factor mapping module 52 can convert the "medium" vulnerability into a vulnerability value. In this manner, non-numeric asset risk factors 50 can be mapped to numeric asset risk factor values 54.

However, the factor mapping module 52 can also map numeric asset risk factors 50 to numeric asset risk factor values 54. This can be useful to limit inputs to a specific range or a specific set of values. For example, one asset risk factor discussed above is the number of SIM incidents related to the asset. While this risk factor is numeric, it can be more useful to convert this number to a value expressing the relative number of incidents for this asset, for example on a scale of 1 to 10.

In one embodiment, the factor mapping module's 52 map is configurable by the system administrator. For example, whether 1000 SIM incidents maps to 6 or 8 (or any other value), or whether a "medium" vulnerability is twice or ten times as important as a "low" vulnerability, can all be configured. In this manner each administrator can configure the risk analysis engine 46 according to his need.

In one embodiment, the asset risk factor values are provided as input for the non-linear statistical data model 56, which produces an output. The output of the non-linear statistical data model 56 is the risk score 58 determined by the risk analysis engine 46. The risk score 58 may be any one of the results 48 shown in FIG. 3, such as the confidentiality risk score, integrity risk score, availability risk score, some other risk score, or one unified risk score for the asset.

As mentioned above, in one embodiment, the non-linear statistical data model 56 is implemented as a neural network. There are numerous software-implemented neural networks available including both proprietary software and open-source software. In one embodiment, the non-linear statistical data model 56 is implemented using the open-source neural network Joone. A neural network is defined largely by the number of inputs, the output layer, and the hidden layers. In one embodiment, the neural network of the non-linear statistical data model 56 has one input for each of the risk factors listed above (with one risk factor associated with impact whose category depends on which risk analysis engine is used), thus having seven inputs, a linear output layer, and two sigmoid hidden layers of ten nodes each. However, the neural network can be set up in numerous other ways, with different number of inputs, layers, and layer types.

In one embodiment, the neural network making up the non-linear statistical data model 56 needs to be trained before it functions accurately. One way to train the non-linear statistical data model 56 is to provide various information technology, network security, and compliance expert with various sets of sample data to evaluate. The sample data and the expert evaluations can then be fed into the non-linear statistical data model 56 which can train itself using a feedback mechanism. In this manner, the risk management module 24 is able to express a consensus of expert opinion rather that the opinion of just one expert. Furthermore, the non-linear statistical data model 56 can be continuously trained and refined with additional expert training.

Figure 5:
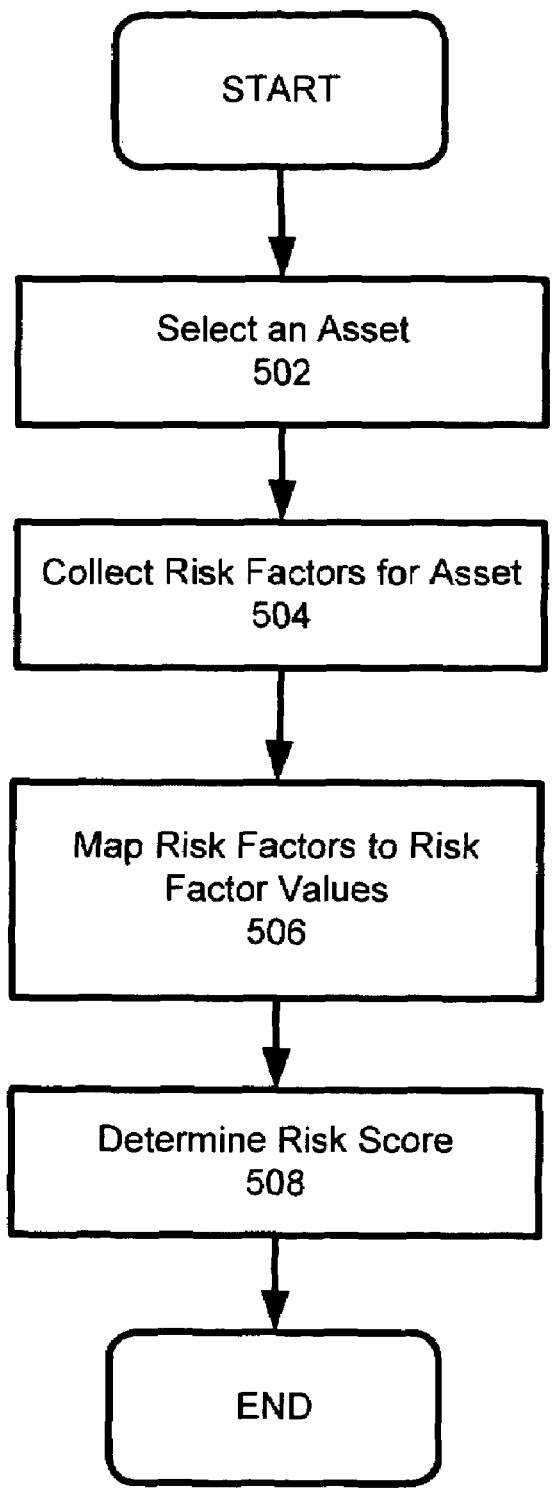
FIG. 5 is a flow diagram illustrating operation of the risk management module according to one embodiment of the present invention.

One embodiment of the operation of the risk management module 24 is now described with reference to FIG. 5. In block 502 one of the enterprises' assets is selected for risk assessment. In one embodiment, the asset is selected from a pool of heterogeneous assets, since the enterprise will have assets of many types and categories, such as various types of machines, applications, facilities, and other assets. However, as described above, the risk analysis engine of one embodiment of the present invention can handle various types of assets, unlike the prior art pre-defined formula type risk analysis.

Asset selection can be performed in a number of ways. For example, a system administrator, risk assessment expert, or other user of the system can indicate the selection via the user or console interface. The user interface can provide a graphical browser interface to allow a user to graphically select a representation of an asset for risk analysis. Thus, in one embodiment, selecting the asset is block 502 means receiving such a selective indication from a system user. The selection can also be performed by a scheduler or other application that conducts periodic risk assessments of various assets.

In block 504, the risk factors for the asset are collected. These can include all the risk factors discussed above, or any additional risk factors. Any attribute associated with an asset can be a risk factor; risk factor is merely a term describing those asset attributes or related information that is deemed relevant for risk analysis. As assets may develop new attributes or may have new information available about them, all such attributes and information may be considered a risk factor.

In block 508, the collected risk factors for the asset are mapped to the risk factor values discussed above. In one embodiment, the mapping is configurable. The risk factor values are in a format that can be provided as input to a neural network, or some other type of non-linear statistical data model, such as genetic algorithm or a Bayesian network. In this manner, in block 508, a risk score is determined using the neural network of other type of non-linear statistical data model. The risk score can represent one specific type of risk, or may be an aggregate risk score. It may be in the form of a percentage, or on any other scale. Before delivered to the system user, the risk score can be converted to a verbal status, such as MEDIUM RISK, a color code, or some other indicator.

Example Computer System

Figure 6:
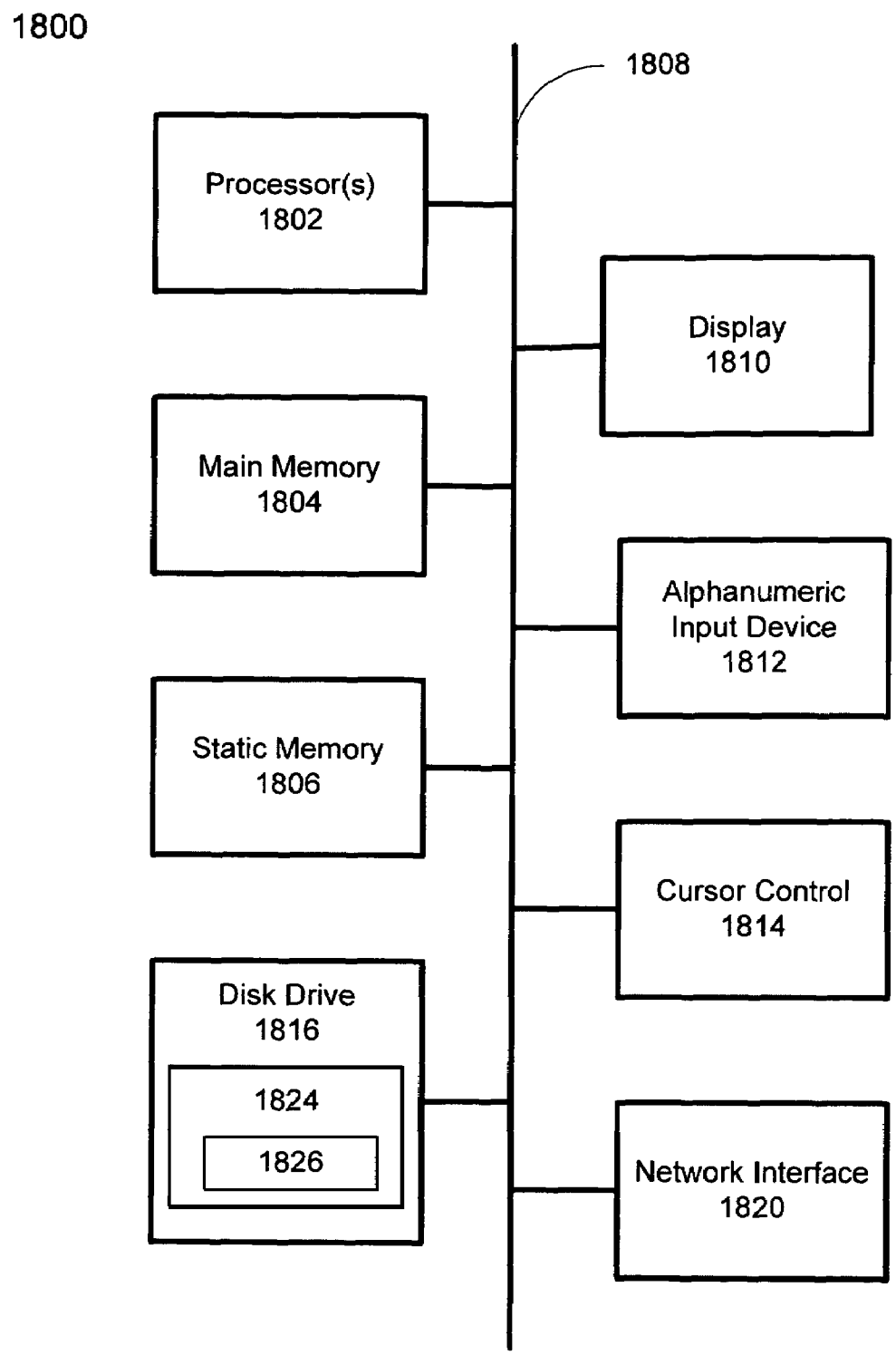
FIG. 6 is a block diagram illustrating an example computer system according to one embodiment of the present invention.

Various embodiments of the present invention have been described in the context of a server that performs compliance, security, and risk management functionalities, and a browser/console interface operable to access and view those functionalities. An example computer system on which such server and/or console interface can be implemented in now described with reference to FIG. 6. Numerous features described with reference to FIG. 6 can be omitted, e.g., a server will generally not include video display unit 1810. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, and a network interface device 1820.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to include, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method of automatically assessing risk associated with one or more assets, comprising the steps of:
   providing a compliance management system on said computer, wherein said computer is connected to a network comprising said assets for allowing said compliance management system to access said network;
   discovering said assets on said network by an asset module of the compliance management system, wherein said discovered assets comprise one or more previously discovered assets and recently added assets;
   selecting an asset from the discovered assets through said compliance management system, wherein the asset comprises one or more attributes, and wherein the asset and the attributes associated with the asset are automatically reported back to the compliance management system;
   collecting a plurality of risk factors associated with said selected asset through an interface module associated with the compliance management system, wherein one or more of said risk factors are collected in real-time by a risk management module of the compliance management system;
   mapping the collected risk factors to a plurality of risk factor values that are input to a non-linear statistical data model;
   calculating a risk score based on one or more of said mapped risk factor values using the non-linear statistical data model, wherein said non-linear statistical data model is self trainable using a feedback mechanism; and
   automatically assessing said risk using said calculated risk score;
   whereby the calculated risk score allows automatic assessment of the risk associated with one or more of the assets.

2. The method of claim 1, wherein selecting the asset comprises receiving an asset selection from a user through a console interface of the compliance management system.

3. The method of claim 1, wherein the plurality of risk factors associated with the asset comprises an impact value of the asset, the impact value representing an importance of the asset to the business enterprise.

4. The method of claim 3, wherein the impact value comprises a confidentiality impact value representing an importance that confidential information contained by the asset is not shared without authorization.

5. The method of claim 4, wherein the risk score comprises a confidentiality risk score, the confidentiality risk score being a measure of risk of the asset sharing confidential information without authorization.

6. The method of claim 3, wherein the impact value comprises an integrity impact value representing an importance that information contained by the asset authentic original content.

7. The method of claim 6, wherein the risk score comprises an integrity risk score, the integrity risk score being a measure of risk of the asset having compromised information.

8. The method of claim 3, wherein the impact value comprises an availability impact value representing an importance that the asset is accessible.

9. The method of claim 8, wherein the risk score comprises an availability risk score, the availability risk score being a measure of risk of the asset will become inaccessible.

10. The method of claim 1, wherein the plurality of risk factors associated with the asset comprises a vulnerability value of the asset, the vulnerability value representing a weakness of the asset that can be exploited.

11. The method of claim 10, wherein collecting the vulnerability value comprises querying a vulnerability scanner, wherein the vulnerability value is imported from said vulnerability scanner by said interface module associated with the compliance management system.

12. The method of claim 1, wherein the plurality of risk factors associated with the asset comprises a security information management factor of the asset, wherein the security information management factor represents number of security incidents associated with the asset.

13. The method of claim 12, wherein collecting the security information management factor comprises querying a security information management (SIM) product.

14. The method of claim 1, wherein the plurality of risk factors associated with the asset comprises a compliance score of the asset, the compliance score representing a compliance of the asset with policies of the business enterprise.

15. The method of claim 14, wherein the compliance score comprises querying a policy module of a compliance management system.

16. The method of claim 1, wherein the plurality of risk factors associated with the asset comprises a determination whether the asset is managed using a distributed software agent.

17. The method of claim 1, wherein the non-linear statistical data model comprises a neural network.

18. The method of claim 1, wherein the plurality of risk factors are mapped to the plurality of risk factor values using a configurable map.

19. A computer system for compliance management, comprising:
   a processor connected to a network for accessing a plurality of assets;
   a network interface module for connecting said compliance management computer system to said assets accessible by said processor through said network;
   an asset module in communication with said network interface for discovering said assets connected to said network, storing said discovered assets in a data base, and for selecting one or more of said stored assets, wherein said asset module is used to configure one or more attributes associated with each of the selected assets via a user interface;

a policy module in communication with said network interface for associating one or more policies stored in a policy database with the assets and for determining a compliance score for the assets based on said associated policies, wherein said policy module enables a user of the compliance management module to manually compile risk assessment surveys through said user interface;

a self assessment module in communication with said network interface for maintaining and accessing self assessment surveys in a data store, wherein said self assessment module provides feed back to said policy module and a risk management module based on said self assessment surveys; and said risk management module in communication with said network interface, comprising:

an interface module for collecting a plurality of risk factors and a compliance score associated with an asset;

a factor mapping module for mapping said collected risk factors to a plurality of risk factor values; and a risk analysis engine comprising a non-linear statistical data model for analyzing risk associated with said asset; wherein said mapped risk factor values are provided as input to said non-linear statistical data model.

20. The computer system for compliance management of claim 19, wherein the non-linear statistical data model comprises a neural network.

21. A machine-readable medium having stored thereon data representing instructions that, when executed by a processor of a risk management system, cause the processor to perform operations comprising:

discovering one or more by a compliance management system, wherein said discovered assets comprise one or more previously discovered assets and recently added assets;

selecting an asset from the discovered assets through said compliance management system;

collecting a plurality of risk factors associated with said selected asset through the compliance management system;

mapping said collected risk factors to a plurality of risk factor values that are input to a non-linear statistical data model;

calculating a risk score based on said mapped risk factor values using said non-linear statistical data model, wherein said non-linear statistical data model is self trainable using a feedback mechanism; and automatically assessing said risk using said calculated risk score.

22. The machine-readable medium of claim 21, wherein the plurality of risk factors associated with the asset comprises an impact value of the asset, the impact value representing an importance of the asset to the business enterprise.

23. The machine-readable medium of claim 22, wherein the impact value comprises a confidentiality impact value representing an importance that confidential information contained by the asset is not shared without authorization.

24. The machine-readable medium of claim 22, wherein the impact value comprises an integrity impact value representing an importance that information contained by the asset authentic original content.

25. The machine-readable medium of claim 22, wherein the impact value comprises an availability impact value representing an importance that the asset is accessible.

26. The machine-readable medium of claim 21, wherein the plurality of risk factors associated with the asset comprises a vulnerability value of the asset, the vulnerability value representing a weakness of the asset that can be exploited.

27. The machine-readable medium of claim 21, wherein the plurality of risk factors associated with the asset comprises an incident value of the asset, the incident value representing a number of security incidents associated with the asset.

28. The machine-readable medium of claim 21, wherein the plurality of risk factors associated with the asset comprises a compliance score of the asset, the compliance score representing a compliance of the asset with policies of the business enterprise.

29. The machine-readable medium of claim 21, wherein the non-linear statistical data model comprises a neural network.

30. The machine-readable medium of claim 21, wherein the plurality of risk factors are mapped to a plurality of risk factor values using a configurable map.

31. A computer implemented method of automatically assessing risk of one or more assets, comprising the steps of:

providing a compliance management system operating on said computer and connecting said computer to a network comprising said assets using a network interface;

discovering said assets on said network by an asset module of the compliance management system, wherein said discovered assets comprise one or more previously discovered assets and recently added assets;

selecting an asset from the discovered assets through said compliance management system, wherein the asset comprises one or more attributes, and wherein the asset and the attributes associated with the asset are automatically reported back to the compliance management;

collecting a plurality of risk factors associated with the selected asset through an interface module associated with the compliance management system, wherein one or more of said risk factors are collected in real-time by a risk management module of the compliance management system;

mapping said determined risk factors to a plurality of risk factor values that are input to one or more non-linear statistical data models;

calculating a risk score based on one or more of said mapped risk factor values using said non-linear statistical data models, wherein the non-linear statistical data models are self trainable using a feedback mechanism; and automatically assessing said risk using said calculated risk score;

whereby the calculated risk score allows automatic assessment of the risk associated with one or more of the assets.

32. The method of claim 31, wherein the non-linear statistical data models utilize one or more of a neural network, a decision tree, a Bayesian network, and a genetic algorithm.

33. A computer implemented system for automatically assessing risk of one or more assets based on compliance of said assets, comprising:

a compliance management system implemented on one or more computers, comprising:

a network interface module for connecting said one or more computers implementing said compliance management system to said assets via a network;

an asset module in communication with said network interface module for selecting the assets and for determining a plurality of risk factors associated with the assets, wherein said asset module is used to configure one or more attributes associated with each of the assets, and wherein said configured attributes reduce said risk of the assets;

a policy module in communication with said network interface module for associating one or more policies with the assets and for determining a compliance score for the assets based on said associated policies;

a self assessment module in communication with said network interface module for maintaining and accessing self assessment surveys, wherein said self assessment module provides feed back to said policy module and a risk management module based on said self assessment surveys; and a risk management module in communication with said network interface module for mapping said determined risk factors to a plurality of risk factor values and for calculating a risk score based on one or more of said mapped risk factor values using one or more non-linear statistical data models, wherein said risk score is used to automatically assess the risk associated with the assets.

34. The computer implemented system of claim 32, wherein said compliance management system comprises a self-assessment module for maintaining and accessing a plurality of self-assessment surveys.

35. The computer implemented system of claim 32, wherein said compliance management system comprises a user interface comprising a plurality of consoles, exposed to users for interacting with said compliance management system, wherein said user interface further comprises a notification module for sending alerts and reports regarding compliance management and risk analysis.

* * * * *